US008240428B2

(12) United States Patent
Humbad et al.

(10) Patent No.: US 8,240,428 B2
(45) Date of Patent: Aug. 14, 2012

(54) ASPIRATOR WITH INTEGRAL MUFFLER

(75) Inventors: Niranjan Humbad, Troy, MI (US); Tom Jerome, Orion, MI (US); Dan Silaghi, Sterling Hts, MI (US); Chris Craft, Utica, MI (US); Tikanand Kulkarni, Maharashtra (IN); Matthew Morris, Lake Orion, MI (US)

(73) Assignee: Behr America Inc., Troy, MI (US)

( * ) Notice: Subject to any disclaimer, the term of this patent is extended or adjusted under 35 U.S.C. 154(b) by 0 days.

(21) Appl. No.: 12/957,960

(22) Filed: Dec. 1, 2010

(65) Prior Publication Data

US 2011/0127106 A1 Jun. 2, 2011

Related U.S. Application Data

(60) Provisional application No. 61/265,599, filed on Dec. 1, 2009.

(51) Int. Cl.
*E04F 17/04* (2006.01)
(52) U.S. Cl. .......................................... 181/224; 181/212
(58) Field of Classification Search .................. 181/212, 181/224
See application file for complete search history.

(56) References Cited

U.S. PATENT DOCUMENTS

| 5,929,397 | A | * | 7/1999 | Satoh et al. .................... 181/229 |
| 6,520,284 | B2 | * | 2/2003 | Spannbauer et al. .......... 181/214 |
| 6,607,432 | B2 | * | 8/2003 | Schaake ......................... 454/143 |
| 7,654,099 | B2 | * | 2/2010 | Mizutani et al. ................ 62/244 |
| 7,802,651 | B2 | * | 9/2010 | Park et al. ...................... 181/224 |
| 2008/0233856 | A1 | * | 9/2008 | Okawa et al. .................. 454/143 |

FOREIGN PATENT DOCUMENTS

JP  01-136808 JP  5/1989
JP  2004-155353  6/2004

* cited by examiner

*Primary Examiner* — Forrest M Phillips
(74) *Attorney, Agent, or Firm* — Muncy, Geissler, Olds & Lowe, PLLC

(57) ABSTRACT

An aspirator with an integral muffler includes a housing having a top, a bottom and a side and an aspirator chamber and a muffler chamber in the housing. The aspirator chamber includes an inlet, an outlet and a venturi section between the inlet and the outlet, and the muffler chamber has an outlet and an inlet in fluid communication with the muffler chamber duct. A duct extends from the muffler chamber outlet into the aspirator chamber.

15 Claims, 6 Drawing Sheets

ASPIRATOR WITH INTEGRAL MUFFLER

This application claims priority to provisional application 61/265,599.

BACKGROUND OF THE INVENTION

1. Field of the Invention

The present invention is directed to an aspirator having a muffler, and, more specifically, toward an aspirator having an aspirator chamber and a muffler chamber connected by a duct with at least a portion of the aspirator chamber and a portion of the muffler chamber being formed from a unitary body of material.

2. Description of Background Art

Modern automobiles often include climate control systems that automatically adjust a vehicle cabin temperature in order to establish and subsequently maintain the temperature at a level set by a user. Such systems include temperature sensors that provide information on current cabin temperature to a system controller, and the controller controls the vehicle heater and/or air conditioner in a well-known manner based on the sensed temperature.

Temperature sensors are often recessed in an instrument panel or otherwise disposed in an out-of-the way location that may not be exposed to air representative of cabin-temperature air. For example, a sensor mounted beneath a dashboard that has been exposed to the sun while the vehicle windows are open may detect a temperature hotter than the actual temperature of the cabin. Likewise, a sensor may be shaded and remain cool for a period of time after the interior of the vehicle has risen to an uncomfortably warm temperature. It is therefore known to provide a mechanism to draw air from the cabin past the temperature sensor in order to expose the temperature sensor to air representative of an actual cabin temperature.

One type of device for drawing air past a temperature sensor is an aspirator, and a conventional aspirator is illustrated in FIG. 11. The aspirator includes a generally T shaped housing 300 having an outlet 302 at the end of one arm of the T-shaped housing 300, an aspirator inlet 304 at the end of the other arm of the T-shaped housing and in inlet tube 306 forming the base of the T-shaped housing. The housing narrows between the inlet tube 306 and the outlet 302 to form a venturi section 308. Air flowing from the inlet tube 306 toward outlet 302 speeds up as it passes through the narrow venturi section 308, and this more-quickly moving air has a lower pressure than the slower moving air in the other parts of the housing 300. The low pressure draws or aspirates air into the T-shaped housing 300 via aspirator inlet 304. Suitable tubing 310 is connected to aspirator inlet 304 and runs to a location behind a vehicle instrument panel (not illustrated) where a temperature sensor 312 is mounted. Thus, when air from the vehicles HVAC system is blown into the vehicle cabin through inlet tube 306 and outlet 302, this moving air also draws ambient cabin air into the tubing 310 and past the temperature sensor 312.

Noise is generated as air passes through venturi section 308, and this noise and further sounds from the HVAC system, may be transmitted along tubing 310 into the vehicle cabin. To reduce such sounds, which may be objectionable to passengers, a muffler 314 may be mounted between the aspirator housing 300 and the temperature sensor 312. This muffler may include foam on its inside to further reduce noise levels. Furthermore, it is sometimes necessary to wrap the muffler 314 with foam to reduce noise produced by movements of the muffler. Present designs thus require at least three elements to draw air over a temperature sensor: an aspirator, a muffler, and tubing to connect the aspirator and the muffler. It would be desirable to provide an improved system for drawing air over a temperature sensor that is effective and easier to manufacture than conventional multi-element systems while at the same time providing equivalent or improved airflow and noise reduction.

SUMMARY OF THE INVENTION

These problems and others are addressed by embodiments of the present invention, a first aspect of which comprises an aspirator having an integral muffler. The aspirator comprises a housing having a top, a bottom and a side which housing includes an aspirator chamber and a muffler chamber. The aspirator chamber has an inlet, an outlet and a venturi section between the inlet and outlet, and the muffler comprises a muffler chamber having an outlet and an inlet in fluid communication with the outlet. A duct extends from the muffler chamber outlet into the aspirator chamber.

Another aspect of the invention comprises an aspirator with an integral muffler that includes a housing and a cover. The housing has a bottom wall, a side wall extending from the bottom wall, a first end wall having an inlet and a second end opposite the first end wall. The housing also includes a medial wall defining with the first end wall a muffler chamber on a first side of the medial wall, and the medial wall includes an outlet for the muffler chamber. The bottom wall includes an opening into the housing spaced from the muffler chamber, and the second end comprises an opening in fluid communication with the bottom wall opening. The cover is connected to the housing to form an airtight seal therewith. The housing further includes a venturi section between the bottom wall opening and the housing second end and a duct extending from the muffler chamber outlet toward the housing second end, the duct placing the venturi section in fluid communication with the inlet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
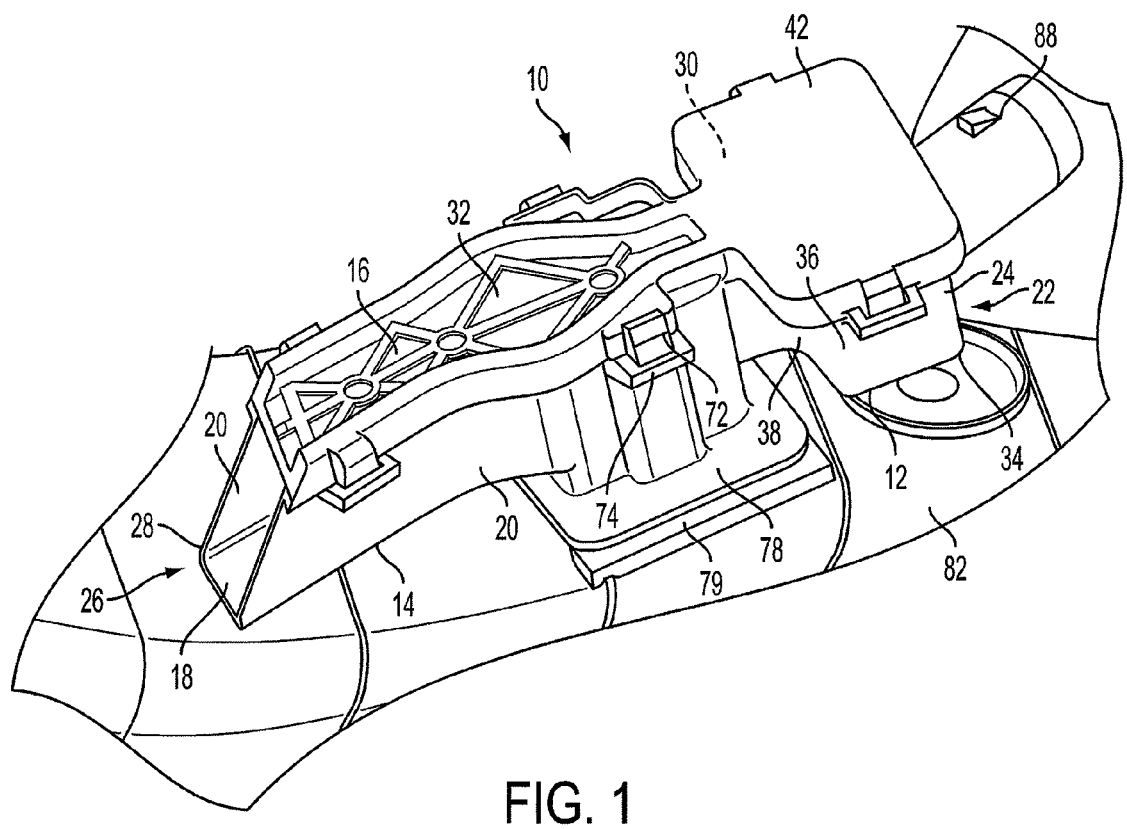
FIG. 1 is a perspective view of an aspirator having a body portion and a cover portion according to a first embodiment of the present invention.
Figure 2:
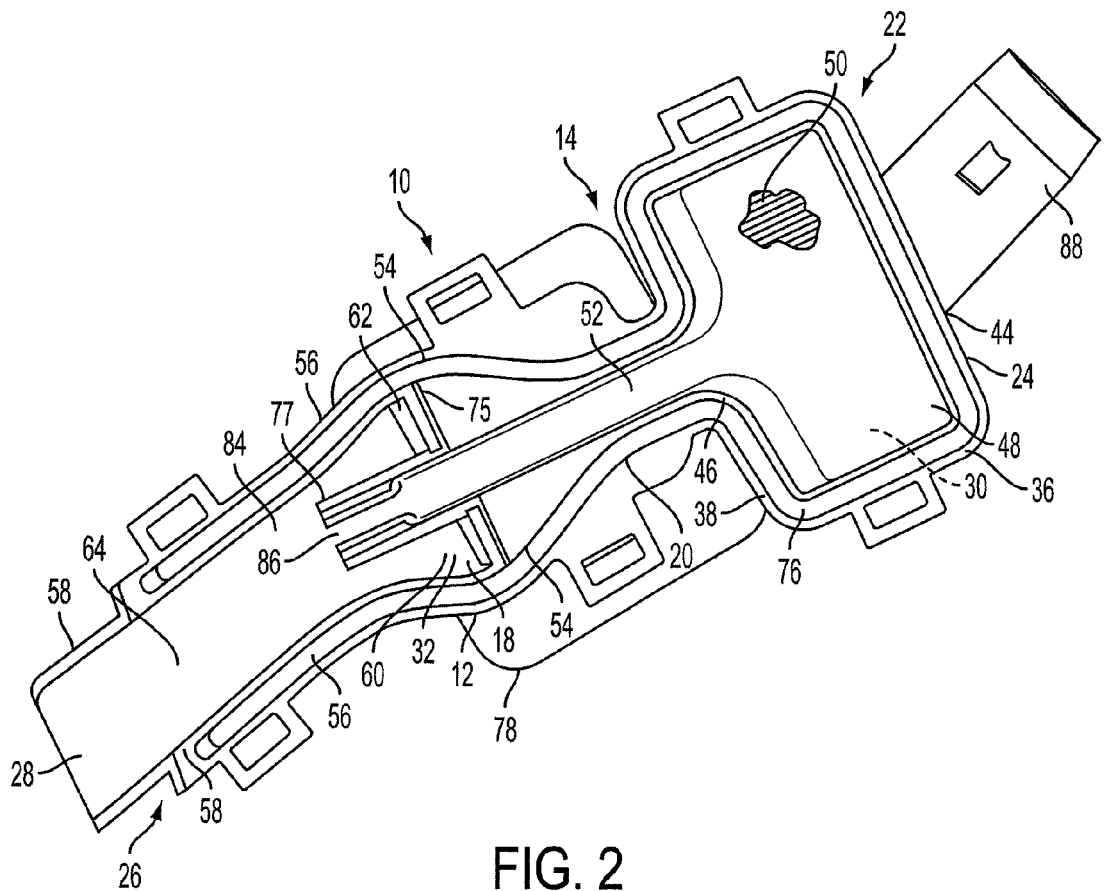
FIG. 2 is a top plan view of the body portion of the aspirator of FIG. 1.
Figure 3:
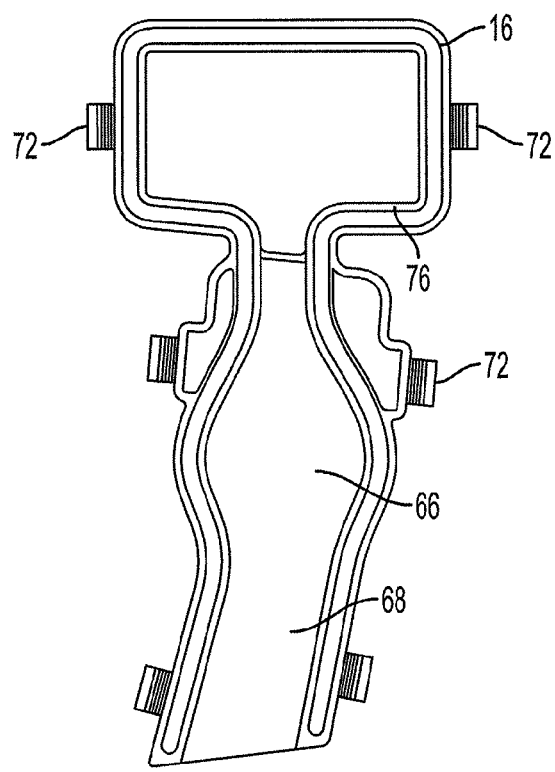
FIG. 3 is a bottom plan view of the cover portion of the aspirator of FIG. 1.

FIG. 1 illustrates an aspirator 10 comprising a housing 12 formed from a body portion 14 and a cover 16. Body portion 14 includes a bottom wall 18, first and second side walls 20 extending from bottom wall 18, a first end 22 having a first end wall 24 and a second end 26 having an opening 28. Aspirator 10 includes a muffler chamber 30 and an aspirator chamber 32, both illustrated in FIG. 2. The muffler chamber 30 is defined by first end wall 24, a first end portion 34 of bottom wall 18, first portions 36 of sidewalls 20 extending from first end wall 24, one or more medial walls 38 between the muffler chamber 30 and the aspirator chamber 32 and a first end portion 42 of cover 16. The first end wall 24 includes an inlet 44 into muffler chamber 30 and the medial wall 38 has an outlet 46 allowing fluid communication between the muffler chamber 30 and the aspirator chamber 32. A dome 48, illustrated in FIG. 2, in muffler chamber 30 optionally encloses a layer 50 of sound absorbing material and includes a duct 52 that extends into aspirator chamber 32 and which fluidly connects muffler chamber 30 and aspirator chamber 32.

Aspirator chamber 32 is defined by opposed, convex portions 54 of first and second side walls 20, opposed, concave portions 56 of side walls 20, parallel portions 58 of sidewalls 20, a central portion 60 of bottom wall 18, which includes an opening 62 between convex side wall portions 54 and a second end portion 64 of bottom wall 18 between parallel wall portions 58. Duct 52 traverses or passes over opening 62 but does not substantially block the opening 62. Aspirator chamber 30 is further defined by a central portion 66 of cover 16 overlying the central portion 60 of bottom wall 18 and a second end portion 68 of cover 16 overlying second end portion 64 of bottom wall 18.

Cover 16 is connected to side walls 20 in a manner that provides a substantially airtight seal between the cover 16 and the side walls 20. This may be accomplished through the use of a plurality of tabs 72 on cover 16 which releasably engage receivers 74 on side walls 20 to secure cover 16 to the side walls 20. Alternately, cover 16 could be fixedly connected to sidewalls 20 by vibration welding or the use of suitable adhesives, for example, or in any other conventional manner. In addition to the seal formed around the periphery of cover 16, first additional cover seal areas 75 are formed between duct 52 and convex sidewall portions 54 and second additional cover seal areas 77 are formed along edges of duct 52 extending from first additional seals 75 to the open end of duct 52. In either case, a bead 76 of thermoplastic vulcanizate (TPV) such as Santoprene brand TPV made by the Exxon/Mobile Chemical Company, may be used to facilitate the formation of such an airtight seal.

Figure 4:
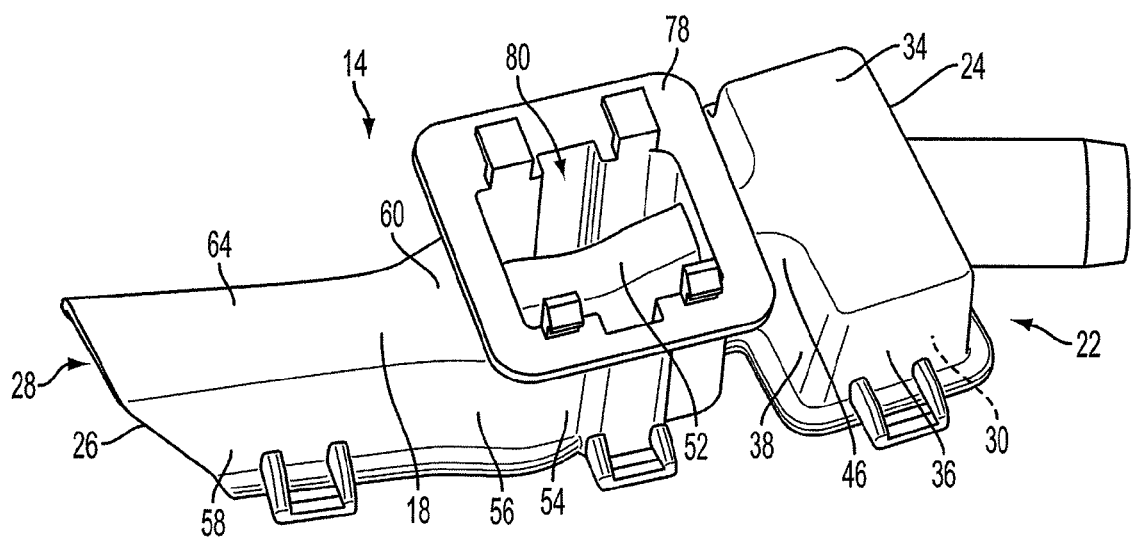
FIG. 4 is a bottom perspective view of the aspirator body portion of FIG. 2.
Figure 5:
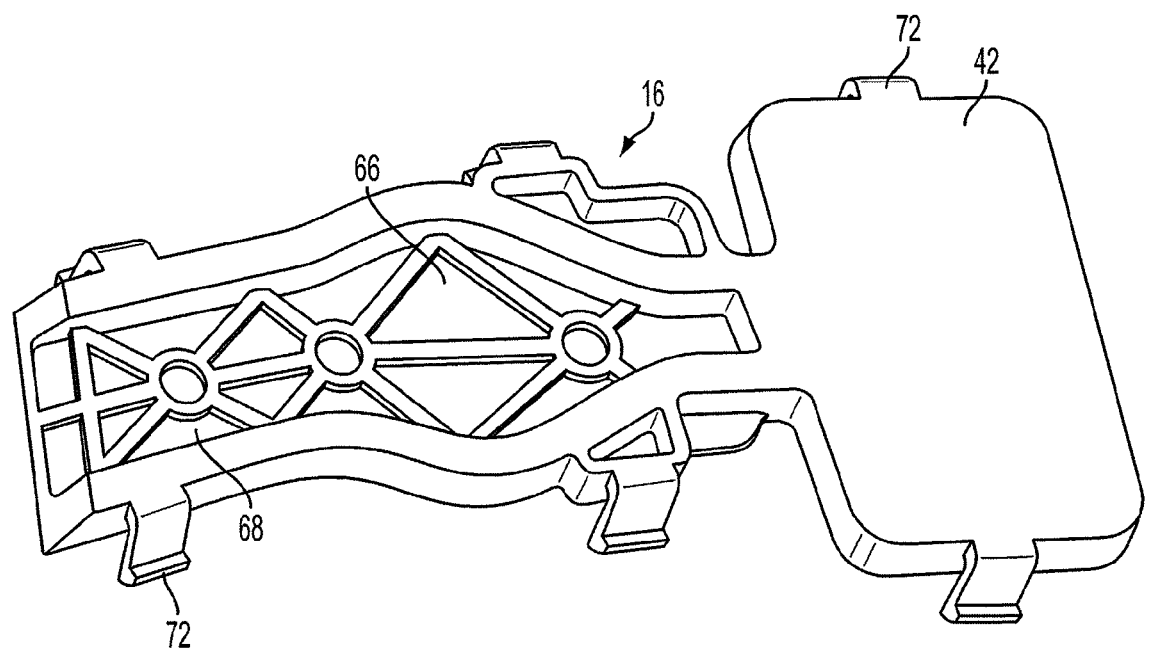
FIG. 5 is a top plan view of the aspirator cover portion of FIG. 3.

A mount 78, illustrated in FIGS. 1 and 4, having a central opening 80 connects body portion 14 of aspirator 10 to an HVAC passage 82 illustrated in FIG. 1 so that some of the air flowing through passage 82 will enter opening 80, travel into aspirator chamber 32 and exit the aspirator 10 through second end opening 28. A foam seal 79 may be included to improve the airtightness of the connection between the mount and the HVAC passage 82. In this manner, aspirator 10 functions as a vent opening for an HVAC system, and the second end 26 of aspirator 10 can be configured as appropriate for the vehicle and location in which it is used.

The concave portions 56 of side walls 20 form a venturi section 84 (FIG. 2) in aspirator chamber 32, and air entering aspirator chamber 32 through opening 62 in central portion 60 of bottom wall 18 increases in speed as it passes through the venturi section 84. In a well known manner, this higher-speed fluid flow has a lower pressure than the fluid on either side of verturi section 84. An end 86 of duct 52 in or near venturi section 84 is exposed to this lower pressure, and fluid is thus drawn out of duct 52 when fluid flows through the aspirator chamber 32. This in turn draws fluid into and through muffler chamber 30 from inlet 44. A tube 88 connected to inlet 44 lead to a temperature sensor (not shown), and air passing through the aspirator 10 thus draws air into tube 88 past the temperature sensor and from their into muffler chamber 30 and aspirator chamber 32. Noise is produced by air traveling through aspirator 10 and venturi section 84, and vibrations from the HVAC system may also be transmitted to the aspirator 10; however, muffler chamber 30 with its optional layer of sound absorbing material 50, prevents a significant portion of this noise from being transmitted to the passenger compartment of a vehicle.

Figure 11:
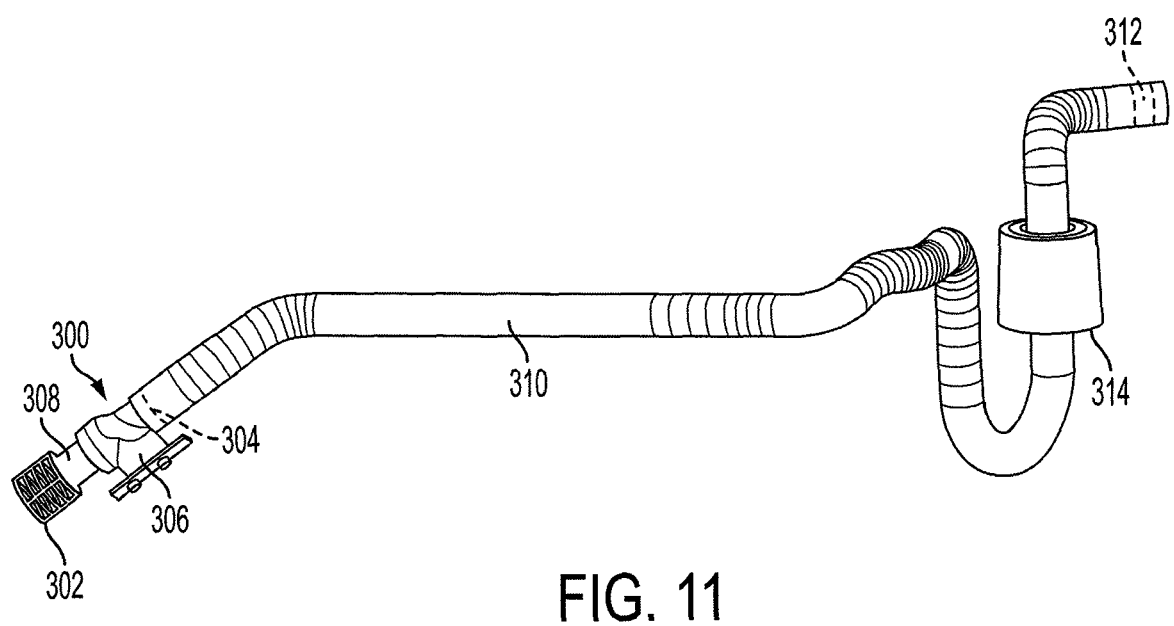
FIG. 11 is a perspective view of a conventional aspirator connected to a separate, conventional, muffler by tubing.

The body portion 14 and cover 16 of aspirator 10 can each be molded as a unitary structure, and the tooling required for the generally flat walls of housing 12 is often less expensive that that required for producing the conventional aspirator of FIG. 11 making the disclosed aspirator easier and less expensive to manufacture than conventional aspirators. Moreover, the combined aspirator and muffler occupies less space in a vehicle that the separate aspirator and muffler of FIG. 11, yet provides acoustic and airflow performance similar or slightly better than that provided by the conventional design.

Figure 6:
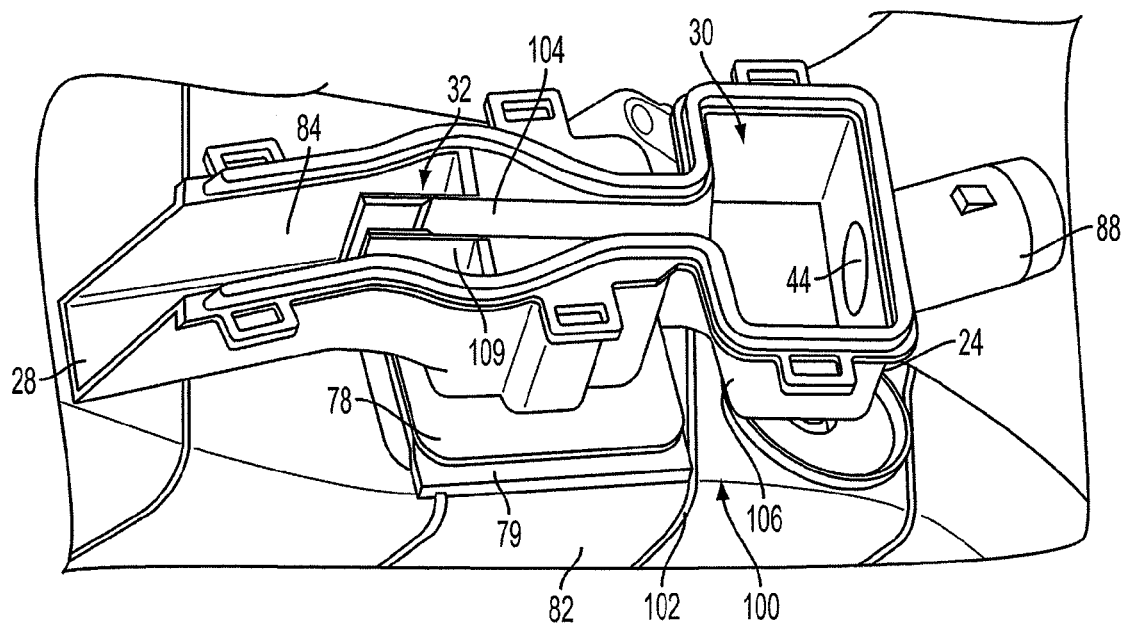
FIG. 6 is a perspective view of the body portion of an aspirator according to a second embodiment of the present invention.
Figure 7:
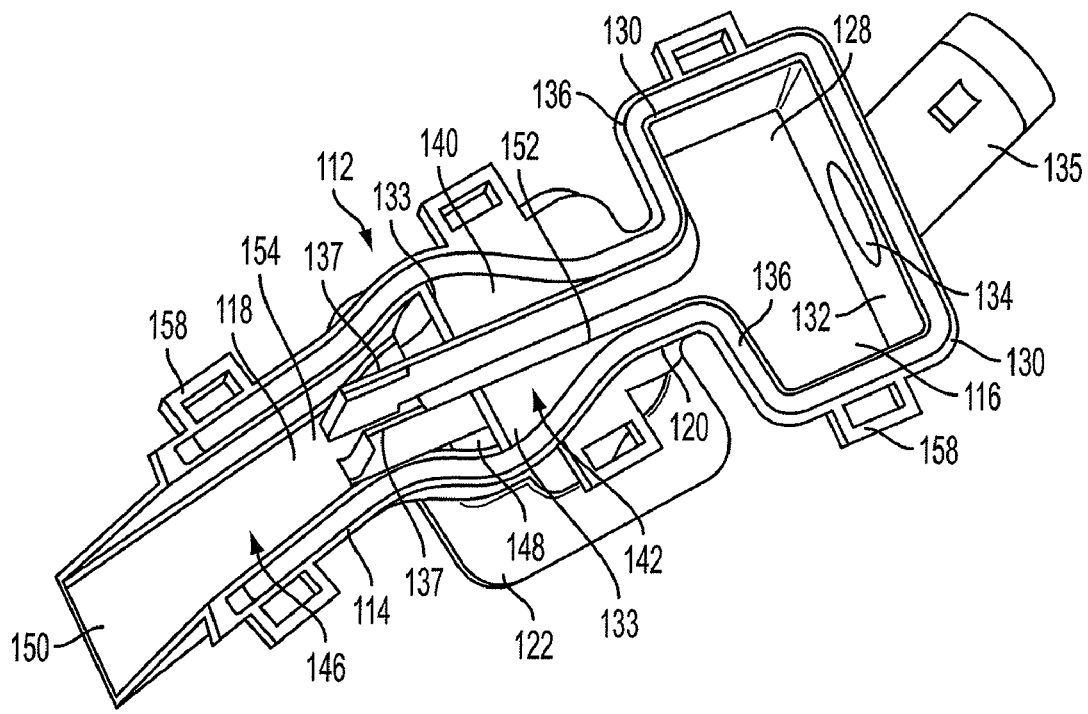
FIG. 7 is a top perspective view of a body portion of an aspirator according to a third embodiment of the present invention.
Figure 8:
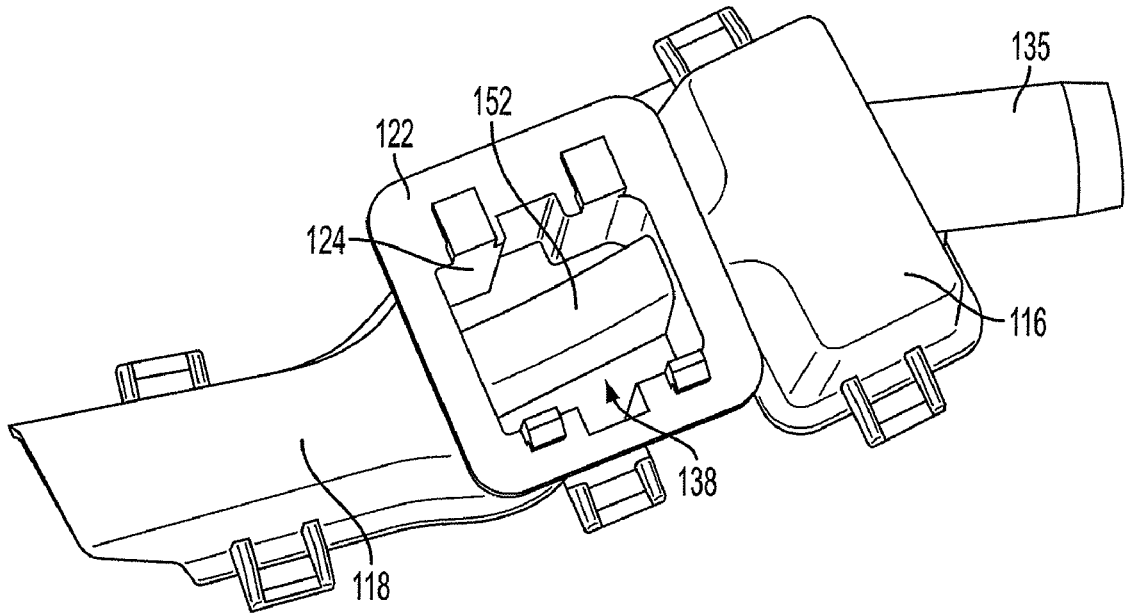
FIG. 8 is a bottom perspective view of the aspirator body portion of FIG. 7.
Figure 9:
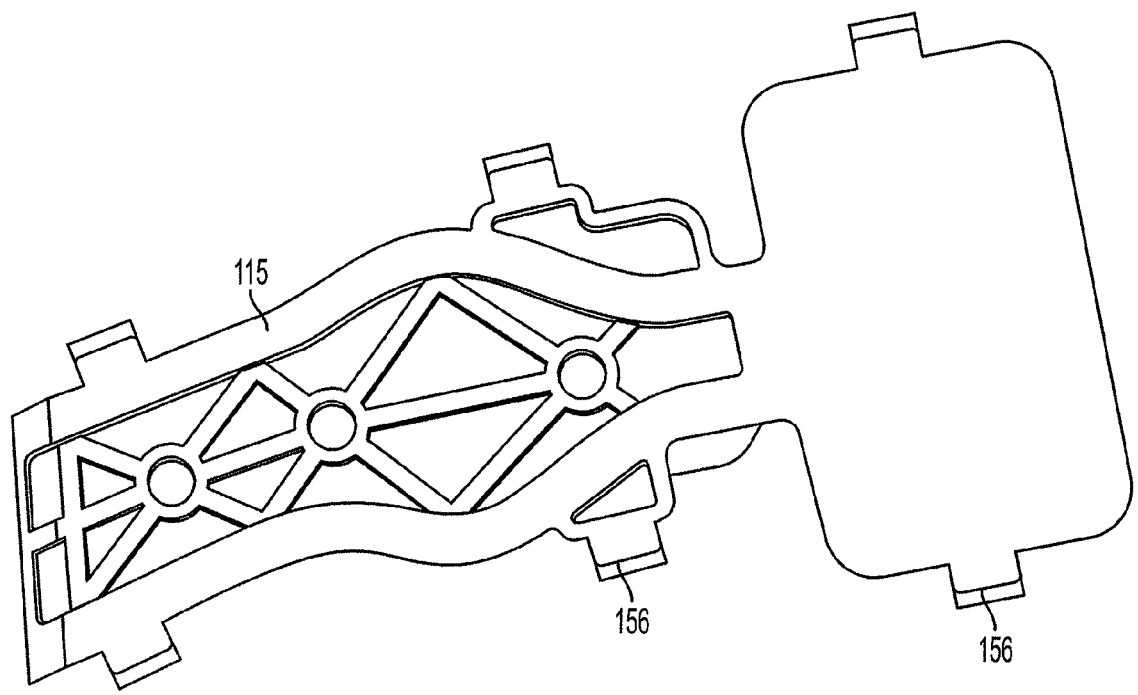
FIG. 9 is a top perspective view of a cover of the aspirator according to the third embodiment of the present invention.
Figure 10:
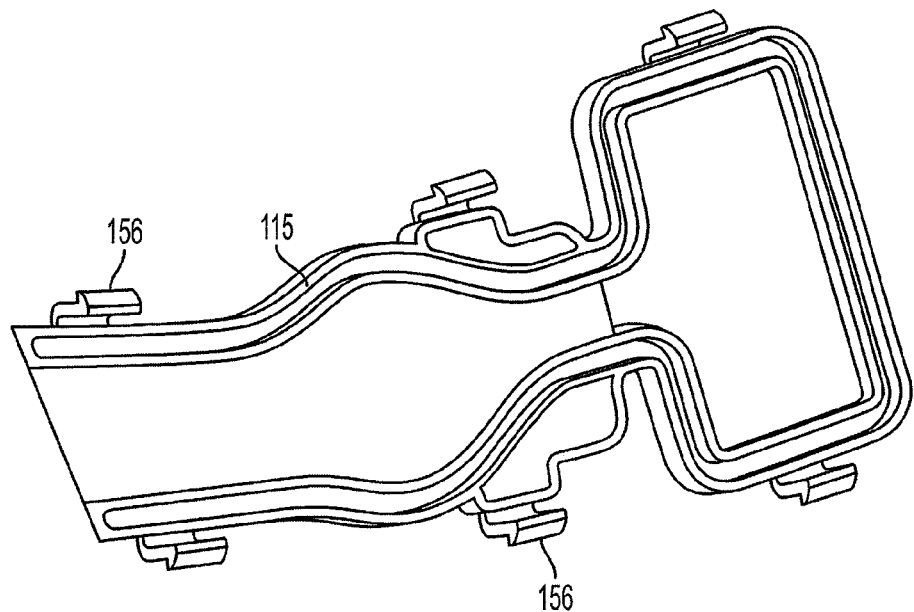
FIG. 10 is a bottom perspective view of the cover of FIG. 9.

A second embodiment of an aspirator according to the present invention is illustrated in FIG. 6. Elements of aspirator 100 common to aspirator 10 are identified with the same reference numerals and the description thereof is not repeated hereinafter. Aspirator 100 does not include a muffler dome 48 but instead, a duct 102 is formed by first and second walls 104 extending toward second end opening 28 from a medial wall 106 between the muffler chamber 30 and the aspirator chamber 32. First and second walls 104 and duct 102 end in the vicinity of the venturi section 84, and a cover (not illustrated) forms an airtight seal with the muffler chamber 30, the aspirator chamber 32 and the first and second walls 104 and thereby forms a top wall of duct 102. Aspirator 100 does not include sound absorbing material in muffler chamber 30, but such material could be provided if additional noise reduction were required.

A third embodiment of the present invention is illustrated in FIGS. 7-10. The aspirator of this embodiment comprises a housing 112 formed from a body portion 114, illustrated in FIGS. 7 and 8, and a cover 115, illustrated in FIGS. 9 and 10. Body portion 114 includes a muffler chamber 116 and an aspirator chamber 118 in fluid communication with the muffler chamber 116 through a neck 120. A mount 122 having a central passage 124 connects aspirator chamber 118 to an HVAC passage (not illustrated).

Muffler chamber 116 includes a bottom wall 128, first and second side walls 130, a rear wall 132 connecting first and second side walls 130 and including an inlet 134, and two medial walls 136 that extend inwardly from each of side walls 130 between rear wall 132 and aspirator chamber 118 and then turn toward aspirator chamber 118 to form neck 120 in fluid communication with the muffler chamber 116.

Aspirator chamber 118 includes a first portion 138 (FIG. 8) in fluid communication with the central passage 124 of mount 122, a wall 140 separating first portion 138 of aspirator chamber 118 from a second portion 142 of aspirator chamber 138. A third portion 146 of aspirator chamber 118 communicates with the first portion 138 of aspirator chamber 118 through openings 148 and includes an outlet 150 from the aspirator 110. A duct 152 extends from neck 120 to third portion 146 of aspirator chamber 118 and separates the two openings 148 from one another. A narrowed portion 154 of aspirator chamber 118 forms a venturi section near the end of duct 152.

In use, air traveling through HVAC passage 126 under pressure enters first portion 138 of aspirator chamber 118 through central passage 124 of mount 122 and passes through openings 148 into third portion 146 of aspirator chamber 118. This air passes through narrowed portion 154 of aspirator chamber 118 and from their exits the aspirator. The pressure drop caused by the increased air speed in narrowed portion 154 of aspirator 118 draws air from muffler chamber 116, through neck 120 and duct 152 into the aspirator chamber 118, and as air is pulled out of the muffler chamber 116 through neck 120, it is replaced with air entering muffler chamber 116 through inlet 134 and tube 135, which in turn draws air past a temperature sensor (not illustrated) upstream from inlet 134 as previously described.

Cover 115 forms an airtight seal with the rear wall 132, side walls 130 and medial walls 138 of muffler chamber 116, the walls of neck 120 and with the sidewalls forming aspirator chamber 118. Additional seals are formed along ridges 133 which extend from duct 152 to the sidewalls of the aspirator and along the top edges 137 of the end portions of duct 152. Cover 115 includes tabs 156 which engage receivers 158 on the aspirator body portion 114. The tabs and receivers may be eliminated if cover 115 is welded or otherwise fixedly connected to aspirator body 115.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An aspirator with an integral muffler comprising:
a housing having a top, a bottom and a side;
an aspirator chamber in said housing having an inlet, an outlet and a venturi section between said aspirator chamber inlet and said aspirator chamber outlet;
said integral muffler comprising a muffler chamber in said housing having an outlet and an inlet configured to be in fluid communication with said outlet; and
a duct extending from said muffler chamber outlet into said aspirator chamber.

2. The aspirator of claim 1 wherein said duct extends from said muffler chamber outlet into said venturi section.

3. The aspirator of claim 2 wherein said side of said housing defines a portion of said duct.

4. The aspirator of claim 2 including a layer of sound absorbing material in said enclosed muffler chamber.

5. The aspirator of claim 2 wherein said duct overlies said aspirator chamber inlet.

6. The aspirator of claim 2 wherein said top of said housing comprises a cover removably attached to said side of said housing.

7. The aspirator of claim 6 wherein said cover defines a wall of said duct.

8. The aspirator of claim 2 wherein said housing top and said housing bottom each define portions of said muffler chamber and said aspirator chamber.

9. The aspirator of claim 6 wherein said cover forms a first air-tight seal with said duct and a second air-tight seal with said side of said housing.

10. An aspirator with an integral muffler comprising:
a housing having a bottom wall, a side wall extending from said bottom wall, a first end wall having an inlet and a second end opposite said first end wall; a medial wall defining with said first end wall a muffler chamber on a first side of said medial wall, said medial wall including an outlet for said muffler chamber, said bottom wall including an opening into said housing spaced from said muffler chamber, said second end comprising an opening in fluid communication with said bottom wall opening; and
a cover connected to and forming an air-tight seal with said housing;
said housing further including a venturi section between said bottom wall opening and said housing second end and a duct extending from said muffler chamber outlet toward said housing second end, said duct placing said venturi section in fluid communication with said inlet.

11. The aspirator of claim 10 wherein said housing comprises a unitary molded element.

12. The aspirator of claim 10 wherein said duct traverses said bottom wall opening.

13. The aspirator of claim 10 wherein said cover is removably attached to said side wall.

14. The housing of claim 10 including a layer of sound absorbing material in said muffler chamber.

15. The housing of claim 10 wherein said cover, bottom wall and side wall each define a portion of said muffler chamber and a portion of said duct.

* * * * *